United States Patent [19]

Saint-Sevin et al.

[11] 4,405,204

[45] Sep. 20, 1983

[54] POSITIONING CONTROL DEVICE

[75] Inventors: Michel Saint-Sevin, Gagny; Michel Blot, Arpajon; Jacques Moirez, Paris, all of France

[73] Assignee: Societe d'Optique, Precision Electronique & Mecanique, Levallois-Perret, France

[21] Appl. No.: 242,762

[22] Filed: Mar. 11, 1981

[30] Foreign Application Priority Data

Mar. 19, 1980 [FR] France .............. 80 06127

[51] Int. Cl.³ .................. G02B 27/14; G01B 3/00
[52] U.S. Cl. ................................. 350/174; 356/399
[58] Field of Search ............ 350/174, 172, 171, 291, 350/144; 356/399, 138, 375, 390, 22

[56] References Cited

U.S. PATENT DOCUMENTS

| 3,149,196 | 9/1964 | Roth | 356/138 |
| 3,530,388 | 9/1970 | Guerra et al. | 350/171 |
| 3,873,210 | 3/1975 | Konopka | 356/138 |

Primary Examiner—Jon W. Henry
Attorney, Agent, or Firm—Pollock, Vande Sande & Priddy

[57] ABSTRACT

Apparatus for guiding aircraft to predetermined parking locations, comprising an optical assembly centered on a reference point, and adapted to provide the pilot in the moving aircraft with two images of a reference point located on the aircraft. When the two images are superimposed, the aircraft has reached the desired location.

6 Claims, 4 Drawing Figures

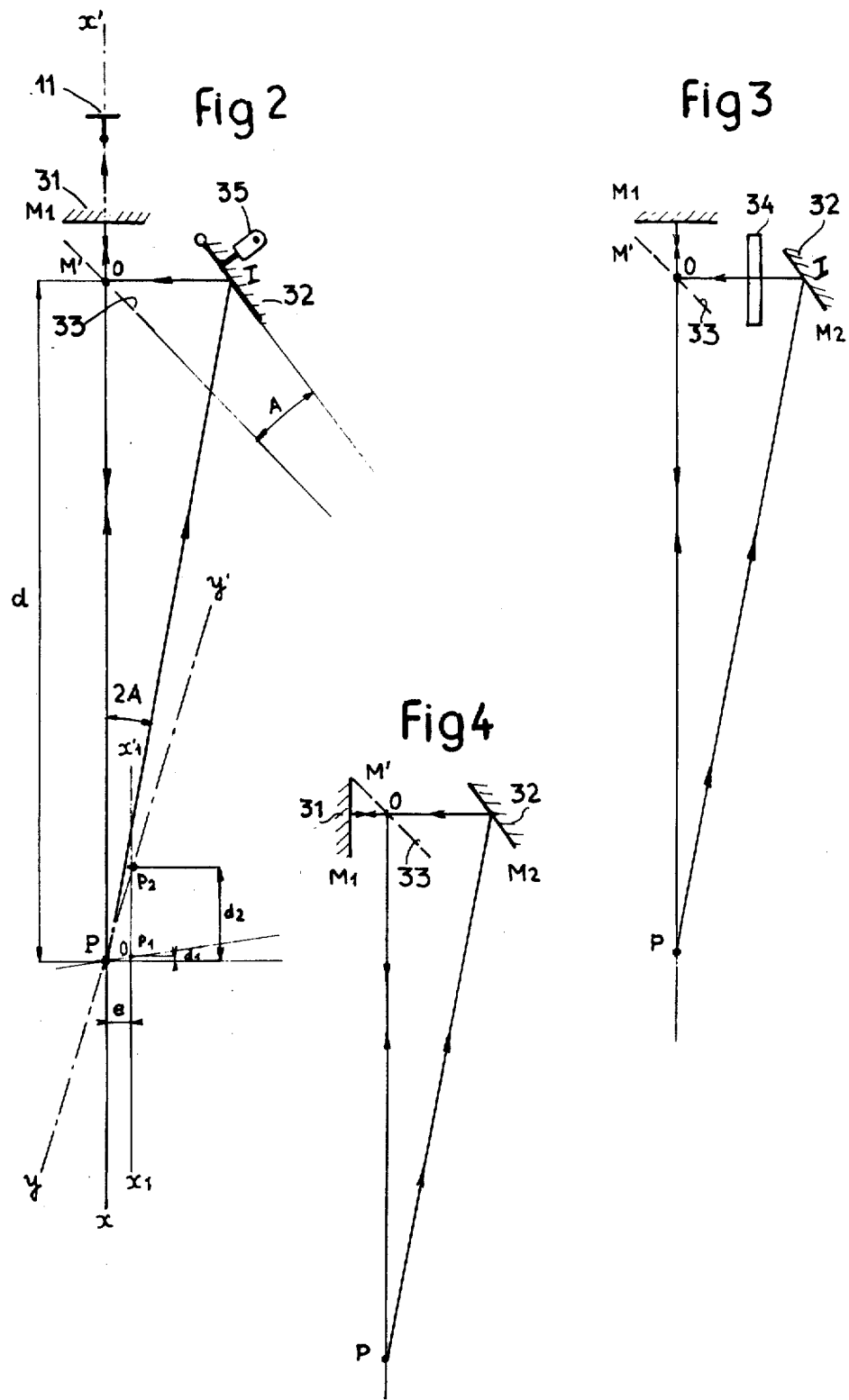

POSITIONING CONTROL DEVICE

BACKGROUND OF THE INVENTION

The invention relates to a device for controlling the positioning of an observer moving over a plane at a parking position (P) located at a distance (d) from a fixed reference point (o).

The invention applies particularly to the positioning of an aircraft in a parking area.

In airports, it is necessary to place the aircraft at clearly defined parking positions. This is particularly the case when the airport includes satellite boarding stations equipped with telescopic gangways which are brought to a position against the door of the aircraft. Actually, even if it is possible to adjust the position of the final portion of the gangway, this can only be done within fairly tight limits. On the other hand, several aircraft are often placed around the same satellite station, and, in this case, it is obvious that the parking positions of the aircraft must be adhered to with a fair degree of accuracy.

Until now, very simple but relatively imprecise methods have been used for guiding pilots to their parking position.

One of these methods which is currently in use consists in guiding the aircraft along an approach line right up to the point of parking which is indicated to the pilot by means of a reference point. For example, the approach line is a straight line passing through the parking position (P) and through a reference point (O), and this may in practice be provided either on the ground, or by using alignment of two reference points, e.g., lights, which are spaced from each other. The pilot keeps to this line while observing the alignment and stops when a second alignment indicates to him that he has arrived at his parking position. Consequently, the pilot must look in two directions, which is a somewhat difficult procedure in practice. Alternatively, the two alignments are provided in practice by reference points which, normally, may not be very distant from each other, and consequently the alignment which gives the position for parking only forms a fairly small angle with the line of approach. The result of this is that an error of judgement by the pilot may result in a fairly large difference in position with respect to the fixed parking position (P).

The invention provides a device for parking stations in airports which, without being excessively cumbersome or expensive, allow pilots to park their aircraft with a high degree of accuracy.

SUMMARY OF THE INVENTION

According to the invention, the apparatus comprises an optical assembly which is centered on the reference point O and is adapted to provide an observer who is moving together with the movable object with two images of a reference point located on the moving object, said images being superimposed when the point of reference on the moving object is at the vertical axis of the parking position P.

In a preferred embodiment, the optical system consists of a semi-transparent fixed mirror located in a plane which passes through the fixed reference point O and forms an angle of 45° with the line of approach PO, a reflection device adapted to redirect, parallel to themselves in the opposite direction, the light beams coming from the observer and which have encountered the semi-transparent mirror at the point O, and a plane mirror which forms an angle A with the semi-transparent mirror such that the light beam originating from point P and passing through the point O, after reflection at this mirror, is re-directed in the direction P O after reflection at the semi-transparent mirror.

Preferably, the plane mirror is mounted so as to be orientatable about an axis which is perpendicular to the plane of displacement of the observer and is associated with an orientating device which makes it possible, by varying the angle A, to adjust the distance (d) of the parking position P from the reference point O.

The invention will now be described with reference to a particular embodiment and to some variations which are given by way of example and are illustrated in the attached drawings.

BRIEF DESCRIPTION OF THE DRAWINGS

FIGS. 2, 3 and 4 respectively show an optical diagram and two variants of the device.

DETAILED DESCRIPTION OF EMBODIMENTS

Figure 1:
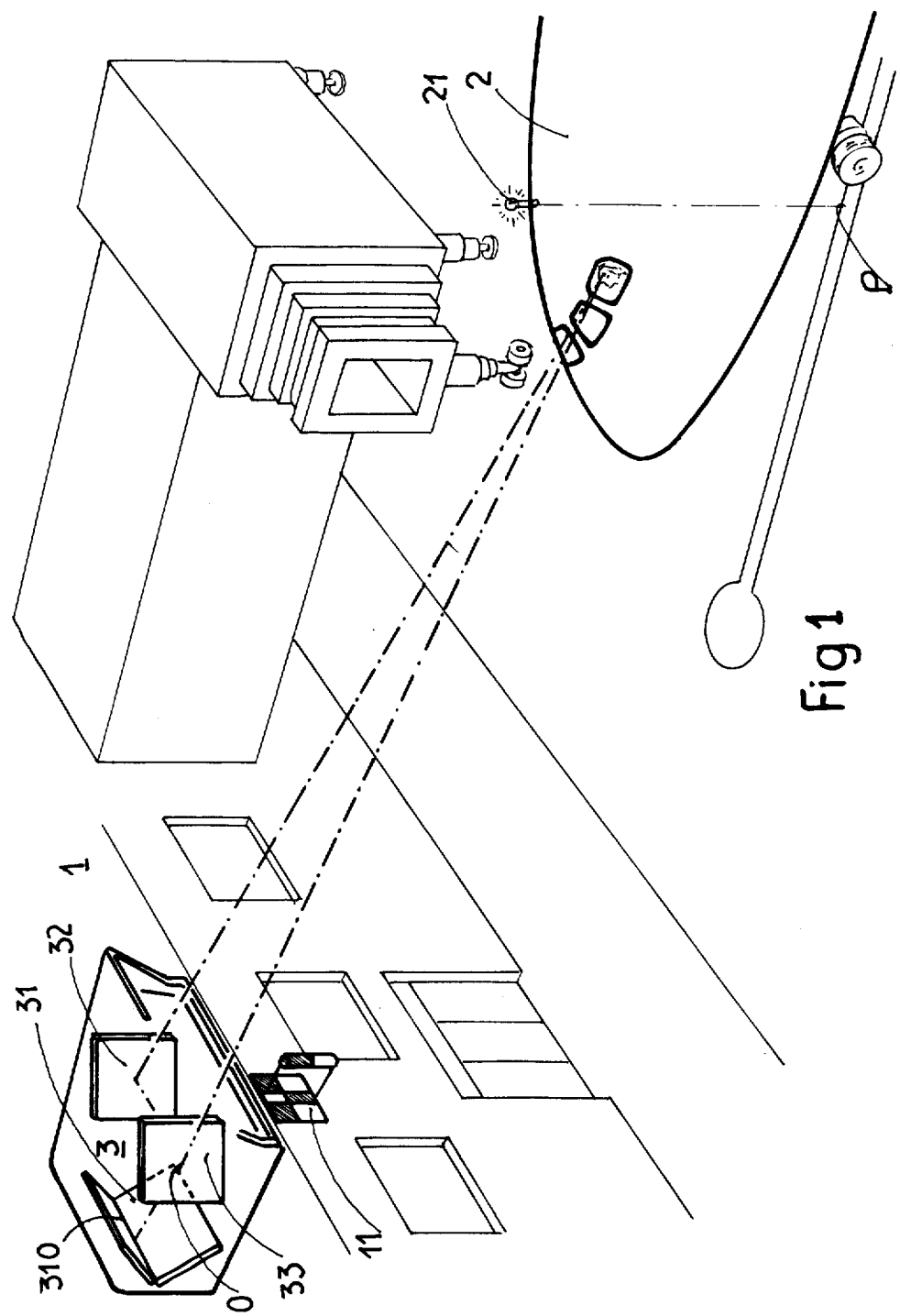
FIG. 1 is a diagramatical view in perspective of an aircraft parking area equipped with a device according to the invention.

In FIG. 1, a satellite station 1 of an airport is shown diagrammatically, an aircraft 2 requiring to be brought to a certain position at this station.

In the conventional way, the aircraft approaches the parking position by keeping to a line of approach which in practice can, for example, be designated by a sighting mark.

The control device according to the invention consists of an optical unit 3 which is placed on the satellite station 1, and the operation of this is shown diagrammatically in FIGS. 2, 3 and 4.

In the embodiment shown, the device consists of two mirrors 31, 32 and a semi-transparent mirror 33. The center of the mirror 33 acts as a reference point O since it is with respect to the latter that measurements of distance are carried out.

The point P at which parking is to take place is located at a distance (d) from the point O. The sighting mark 11 provides in practice the line of approach which is situated in the vertical plane passing through the points O and P.

The mirror 31, in the case of FIGS. 2 and 3, is perpendicular to the straight line OP. Consequently, it sends rays of light coming from the eye of the observer back along their same path, having passed through the semi-transparent mirror 33 which makes an angle of 45° with the line P O and, consequently, with the mirror 31.

The mirror 32 is at an angle A with respect to the semi-transparent mirror 33.

This sytem provides an observer who is moving along the axis xx' which passes through the points P and O and perpendicular to the mirror 31, with two images of himself, the apparent distance between these being a function of the distance of the observer from the mirror 31. The first of these two images is provided by the mirror 31, the second is the result of three reflections, at the mirror 32, the semi-transparent mirror 33 and the mirror 31.

The angle A is selected so that the two images appear, to the observer, to merge into one another when he is located at point P. In this case, as has been shown in the drawing, the light beams encountering the mirror 33 at point O, either directly following the straight line xx', or after reflection at mirror 32, are at an angle with respect to each other equal to 2A.

An observer who is moving along the line xx' consequently sees two images of himself coming closer to each other as he approaches the point P at which the images appear to him to merge.

Such a system consequently keeps the observer informed both as to his distance from the point P, by observing the divergence between the two images, and as to his speed of approach to this same point P, by judging the rate at which this divergence is changing. Positioning can be carried out with a high degree of accuracy if the pilot takes care to make the images of particular points coincide, such as, for example, a flashing light 21 placed on the aircraft.

The stopping distance d equals OP can be adjusted by varying the angle A by means of a graduated device 35 which causes the mirror 32 to rotate about a vertical axis.

It will be noticed that a divergence (e) with respect to the line of approach (xx') results, in the system according to the invention, in an error (d1) which is smaller on the distance (d) which is to be adhered to. It can actually be shown that (d1 = e tan A) and consequently that the stopping distance (d) is only slightly influenced by the lateral accuracy (e) (FIG. 2) of the path being followed by the aircraft in the case where A is small. In FIG. 2, it can be seen that, if the observer is approaching along the line (x1 x'1), he will stop at P1, the error (d1) in the stopping distance being fairly small. On the other hand, if, for example, the parking position P were to have been defined by an alignment (yy'), the aircraft would have stopped at P2, the error (d2) being in this case much more serious. Actually, it is in practice difficult to define transverse alignments which yield good stopping accuracy, and these moreover oblige the pilot to turn his head substantially in order to observe them.

In order to ease superimposition of the two images, it is preferable, as has been shown in FIG. 3, to place a colored filter 34 on the path between the point O on the mirror 33 and the point of incidence on the mirror 32. Nevertheless, one may for this purpose make use of other known systems. For example, it is possible to swing the mirror 32 by inclining it slightly with respect to the vertical. Thus, a slight height divergence is provided between the two images yielded by the system and it is easier to align the two images rather than provide for them to coincide.

As has been mentioned above, the pilot may observe himself or he may alternatively select a reference point 21 on the aircraft, which he will locate vertically above the parking position P.

All that is needed in practice is to select the reference point 21 and to dimension the optical assembly in such a way that the two images of the point of reference become superimposed at the eye of the pilot.

The invention is clearly not limited to the details of the embodiment which has just been described since it is possible to imagine variations in it by making use of equivalent means.

By way of example, in FIG. 4 an alternative arrangement of the mirror 31 has been shown, the mirror in the case being parallel to the line of approach PO. The important thing in practice is that the mirror 31 sends light beams which have encountered the semi-transparent mirror 33 back along the same path to the point O, and in order to achieve that it is sufficient that they form an angle of 45° with the reflecting face of the semi-transparent mirror 33, which in this case has the rays meeting the mirror 32 passing through it without reflection.

In order that the system may be used with aircraft of very different sizes, one might be obliged to provide a mirror having dimensions which are too large. It is for this reason, as has been shown in FIG. 1, that it may be useful to replace the mirror 31 by a 90° dihedron 310 having its line of joining arranged horizontally and orientated at 45° with respect to the semi-transparent mirror 33. It is in fact known that such a dihedron is a non-varying optical arrangement which re-directs, in a direction parallel to themselves, all the rays located in a plane perpendicular to its edge of intersection. Thus, the observer could be located above or below the system, and he would see the two images formed one above the other as in the case described above.

It will be seen that, by making use of the system according to the invention, the pilot of the aircraft is at all times kept informed of his distance from the stopping point without it being necessary for him to turn his head, since the two images appear in front of him.

It should be noted that the apparatus could also be used in a general manner, for guiding the pilot who is following a rectilinear path. To do this all that would be needed is to mark a reference point on the mirror 31 in the vertical plane passing through the line of approach PO. The pilot would then align the image given by the mirror with this reference point and, at the same time, observe the distance between the two images yielded by the system.

Even though the device has been perfected for the positioning of aircraft on the parking tarmac, it is obvious that it could just as well be used in other applications and, generally speaking, on each occasion when a moving object must be placed at a predetermined point along a predetermined line of approach.

We claim:

1. Apparatus for controlling the positioning of an aircraft in a parking area at a predetermined parking location (P), comprising
   (a) means for materializing a line of approach (PO) located in a vertical plane passing through said parking location (P) through a fixed reference point (O) located at a distance from said parking location;
   (b) a semi-transparent mirror (33) the center of which is located at said reference point (O) and which forms a 45° angle with said line of approach (PO);
   (c) a reflecting device (3) adapted to redirect, parallel to themselves, light beams which have passed through said semi-transparent mirror (33), so as to form in the eye of an observer in said aircraft a first image of a reference point (21) located on said aircraft;
   (d) a plane mirror (32) adapted to form in the eye of said observer a second image of said reference point (21) on said aircraft, after three reflections, on said plane mirror (32), said semi-transparent mirror (33) and said reflecting device (3);
   (e) said plane mirror (32) forming with said semi-transparent mirror (33) an angle (A) such that said first and second images are superimposed when said reference point (21) on said aircraft is located on the vertical axis of said predetermined parking location (P).

2. Apparatus according to claim 1, wherein said plane mirror (32) is mounted for orientation about a vertical axis and is associated with an orienting device (35) which makes it possible, by varying the angle (A), to adjust the distance (d) of said fixed parking location (P) from said reference point (O).

3. Apparatus according to claim 1, wherein said reflecting device comprises a second plane mirror (31) forming an angle of 45° with the reflecting surface of said semi-transparent mirror (33).

4. Apparatus according to claim 1, wherein said reflecting device comprises a 90° dihedron constituting an optical constant, the juncture line (310) of said dihedron being horizontal and forming an angle of 45° with the reflecting surface of said semi-transparent mirror (33).

5. Apparatus according to any one of claims 1 to 4, comprising a colored filter (34) in the path of the light beams passing from said plane mirror (32) to said semi-transparent mirror (33).

6. Positioning control device according to any one of claims 1 to 4, wherein said plane mirror (32) is very slightly inclined with respect to the vertical.

* * * * *